(12) United States Patent
Yada et al.

(10) Patent No.: US 12,157,535 B2
(45) Date of Patent: Dec. 3, 2024

(54) FRICTIONAL DRIVE UNIT

(71) Applicant: HONDA MOTOR CO., LTD., Tokyo (JP)

(72) Inventors: Wataru Yada, Saitama (JP); Shinichiro Kobashi, Saitama (JP); Toru Takenaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 542 days.

(21) Appl. No.: 17/636,999

(22) PCT Filed: Aug. 5, 2020

(86) PCT No.: PCT/JP2020/029978
§ 371 (c)(1),
(2) Date: Feb. 21, 2022

(87) PCT Pub. No.: WO2021/039324
PCT Pub. Date: Mar. 4, 2021

(65) Prior Publication Data
US 2022/0289331 A1    Sep. 15, 2022

(30) Foreign Application Priority Data
Aug. 30, 2019    (JP) ................................. 2019-157951

(51) Int. Cl.
*B62K 11/00*    (2006.01)
*B60B 19/00*    (2006.01)
*B62K 1/00*    (2006.01)

(52) U.S. Cl.
CPC .......... *B62K 11/007* (2016.11); *B60B 19/003* (2013.01); *B62K 1/00* (2013.01)

(58) Field of Classification Search
CPC ........ B62K 11/007; B62K 1/00; B60B 19/003
See application file for complete search history.

(56) References Cited

U.S. PATENT DOCUMENTS 11,813,890 B2 *  11/2023  Oshima ................. B60B 19/003
11,993,345 B2 *   5/2024  Yada ........................ B62K 1/00

FOREIGN PATENT DOCUMENTS

JP    2011063152 A    3/2011
JP    2011063214 A    3/2011
(Continued)

OTHER PUBLICATIONS

International Search Report for Patent Application PCT/JP2020/029978 mailed Oct. 20, 2020; 2 pp.

*Primary Examiner* — Kevin Hurley
(74) *Attorney, Agent, or Firm* — Armstrong Teasdale LLP (57) ABSTRACT

To provide a frictional drive unit that can arrange drive rollers with high density and facilitate an attachment operation of the drive rollers, a frictional drive unit 2 includes a pair of drive disks 4, a plurality of drive rollers 5 rotatably supported by an outer circumferential portion of each drive disk, a pair of actuators 8 configured to independently rotate the pair of drive disks, and an annular main wheel 7 arranged between the pair of drive disks and coming into contact with the drive rollers. Each drive roller includes a roller shaft 41 and a round roller body 42 provided on an intermediate portion of the roller shaft. Each drive disk includes plural pairs of bearing grooves 45 each receiving both ends of the roller shaft of each drive roller. Each bearing grooves open toward the main wheel.

8 Claims, 7 Drawing Sheets

(56) References Cited

FOREIGN PATENT DOCUMENTS

| JP | 2013237334 | A | | 11/2013 |
|----|------------|---|---|---------|
| JP | 2016203680 | A | | 12/2016 |
| WO | WO-2024152087 | A1 | * | 7/2024 |

* cited by examiner

FRICTIONAL DRIVE UNIT

CROSS-REFERENCE TO RELATED APPLICATIONS

This application is a U.S. National Phase Application of PCT/JP2020/029978 filed Aug. 5, 2020, which claims the benefit of Japanese Patent Application No. 2019-157951 filed Aug. 30, 2019. The contents of these applications are hereby expressly incorporated by reference in their entirety.

TECHNICAL FIELD

The present invention relates to a frictional drive unit.

BACKGROUND ART

A frictional drive unit used as a driving unit of an inverted pendulum vehicle is known (for example, Patent Document 1). The frictional drive unit includes a frame, a pair of drive disks rotatably supported by the frame, a plurality of drive rollers rotatably supported by an outer circumferential portion of each drive disk, an annular main wheel arranged between the pair of drive disks and coming into contact with the plurality of drive rollers, and a pair of actuators configured to independently drive the drive disks. The main wheel is configured to rotate around a central axis and an annular axis. The frictional drive unit controls the rotation of the main wheel around the central axis and the annular axis by controlling the rotational direction and rotational amount of the pair of drive disks, thereby moving the inverted pendulum vehicle in all directions including a forward direction, a backward direction, a leftward direction, and a rightward direction.

The drive disk according to Patent Document 1 includes a slot for receiving each drive roller, bearing holes formed in side walls defining the slot, a roller shaft inserted into each bearing hole in an axial direction thereof and configured to rotatably support the drive roller.

PRIOR ART DOCUMENT(S)

Patent Document(s)

Patent Document 1: JP2011-63214A

SUMMARY OF THE INVENTION

Task to be Accomplished by the Invention

However, the drive disk according to Patent Document 1 needs a space on a side of the slot for inserting the roller shaft into each bearing hole in the axial direction, which makes it difficult to arrange the drive rollers with high density. Further, an operation for inserting the roller shaft into each bearing hole needs to be performed for a large number of drive rollers, which increases the workload of an attachment operation.

In view of the above background, an object of the present invention is to provide a frictional drive unit that can arrange drive rollers with high density and facilitate an attachment operation of each drive roller.

Means for Accomplishing the Task

To achieve such an object, one aspect of the present invention provides a frictional drive unit (2) comprising: a frame (3); a pair of drive disks (4) rotatably supported by the frame, arranged coaxially, and opposed to each other; a plurality of drive rollers (5) provided on an outer circumferential portion of each drive disk and arranged at intervals in a circumferential direction of the drive disk, each drive roller being supported to rotate around an axis inclined relative to the circumferential direction of the drive disk; a pair of actuators (8) configured to independently rotate the pair of drive disks; and a main wheel (7) formed in an annular shape, arranged between the pair of drive disks, coming into contact with the drive rollers, and configured to rotate around a central axis and an annular axis, wherein each drive roller includes a roller shaft (41) and a round roller body (42) provided on an intermediate portion of the roller shaft, each drive disk includes plural pairs of bearing grooves (45) each receiving both ends of the roller shaft of each drive roller, and the bearing grooves open toward the main wheel.

According to this aspect, it is possible to cause each drive disk to rotatably support the drive rollers by simply fitting the roller shaft into the bearing grooves from an opening side thereof. After the roller shaft is received by the bearing grooves, the main wheel is arranged between the pair of drive disks and comes into contact with the drive rollers, so that the drive rollers can be prevented from falling off the bearing grooves. In this aspect, the drive disk does not need a space for inserting the roller shaft into the bearing grooves in the axial direction thereof, so that the drive rollers can be arranged with high density. Further, an operation to attach the drive rollers to the drive disk can be facilitated.

In the above aspect, preferably, each drive disk is configured such that one bearing groove corresponding to a drive roller adjacent to one drive roller is arranged on a plane (P1) that passes through another bearing groove corresponding to the one drive roller and is perpendicular to an axis of the one drive roller.

According to this aspect, the distance between adjacent drive rollers can be reduced, so that the drive rollers can be arranged with high density.

In the above aspect, preferably, a width at an open end of each bearing groove is smaller than a diameter of the roller shaft.

According to this aspect, once fitted into the bearing grooves, the roller shaft is less likely to fall off the bearing grooves. Accordingly, an operation to combine the main wheel and the drive disks to which the drive rollers are attached can be facilitated.

In the above aspect, preferably, outer circumferential portions of surfaces opposed to each other of the pair of drive disks are provided with inclined portions (36) that are inclined to opposite sides as extending radially outward, the bearing grooves are recessed in each inclined portion, and a roller receiving portion (46) configured to partially receive the roller body is provided between each pair of bearing grooves corresponding to one of the drive rollers.

According to this aspect, the structures of the drive disks can be simplified.

In the above aspect, preferably, the bearing grooves and the roller receiving portion are recessed in a direction perpendicular to a surface of each inclined portion.

According to this aspect, the structures of the drive disks can be simplified.

In the above aspect, preferably, the roller receiving portion has a semicircular cross section when viewed in a direction along an axis of the bearing grooves.

According to this aspect, the roller receiving portion can be made smaller, so that the rigidity of the drive disks can be enhanced.

In the above aspect, preferably, the roller body is rotatably supported by the roller shaft, and both ends of the roller shaft are non-rotatably supported by the corresponding bearing grooves.

According to this aspect, the roller shaft is fixed, so that the rotational direction of each drive roller can be stabilized.

In the above aspect, preferably, both ends of the roller shaft are press-fitted into the corresponding bearing grooves.

According to this aspect, the roller shaft is fixed, so that the rotational direction of each drive roller can be stabilized.

Effect of the Invention

Thus, according to the above aspects, it is possible to provide a frictional drive unit that can arrange drive rollers with high density and facilitate an attachment operation of each drive roller.

DETAILED DESCRIPTION OF THE INVENTION

In the following, an embodiment of a frictional drive unit and an inverted pendulum vehicle including the same according to the present invention will be described with reference to the drawings.

Figure 1:
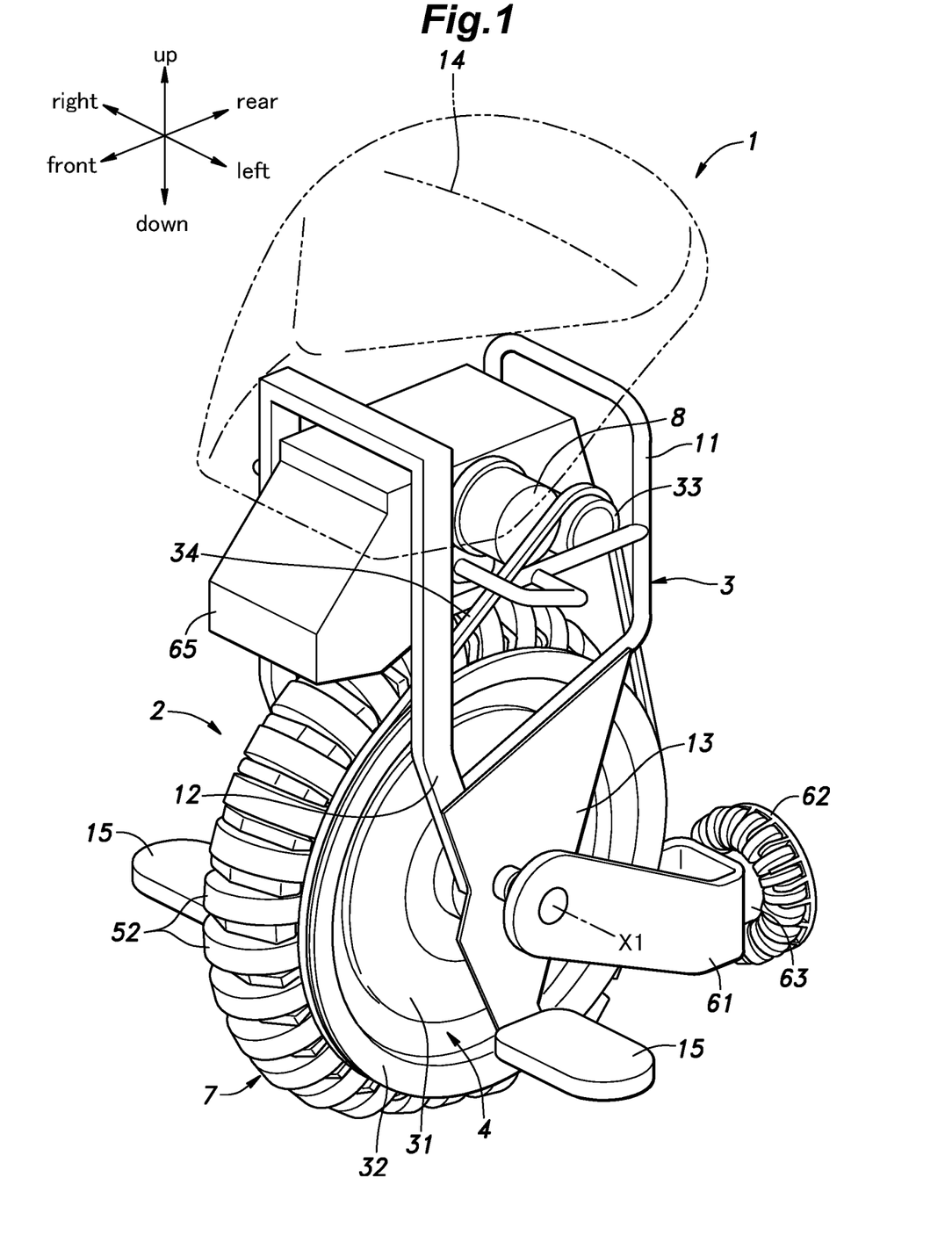
FIG. 1 is a perspective view of an inverted pendulum vehicle provided with a frictional drive unit according to an embodiment.
Figure 2:
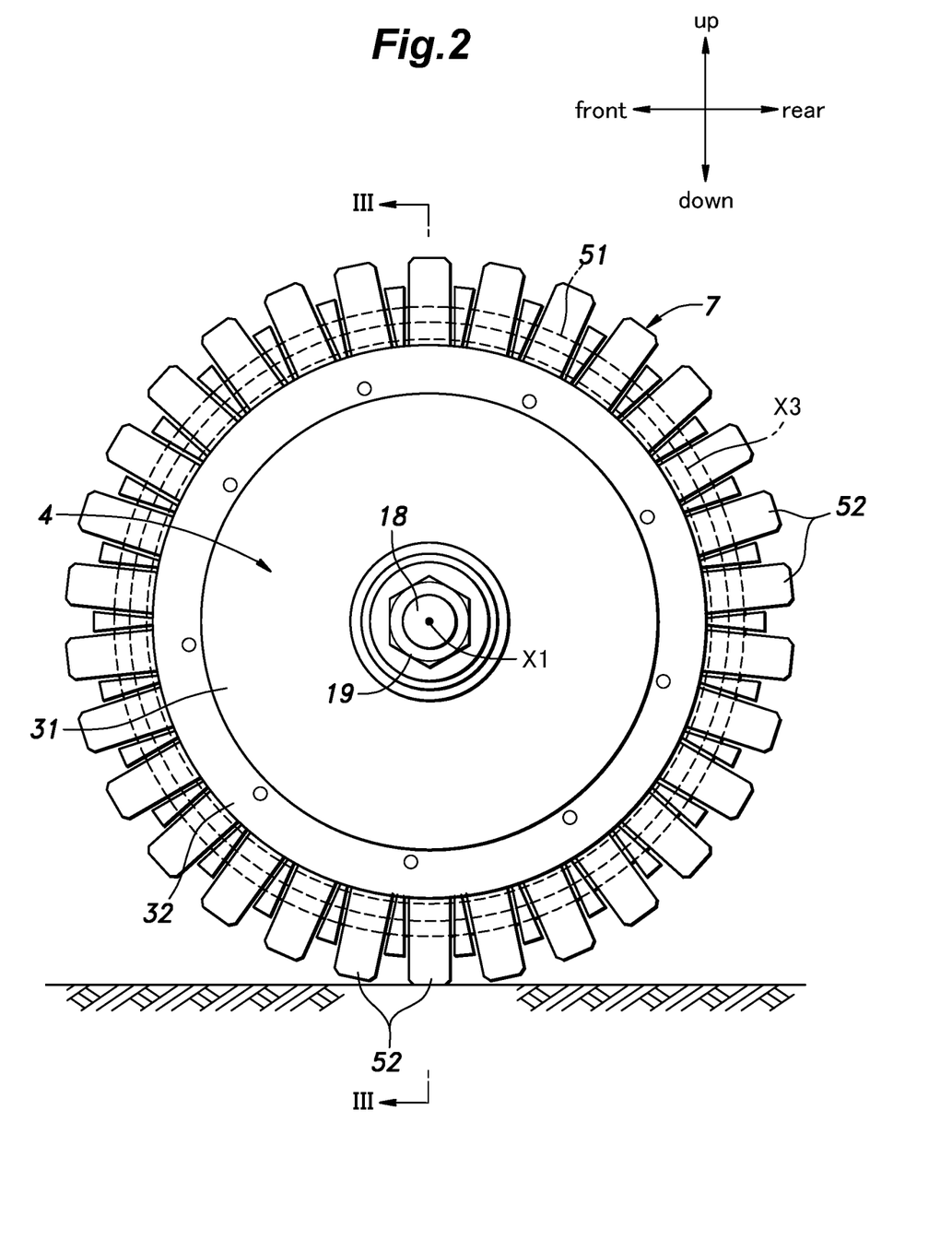
FIG. 2 is a side view of the frictional drive unit.
Figure 3:
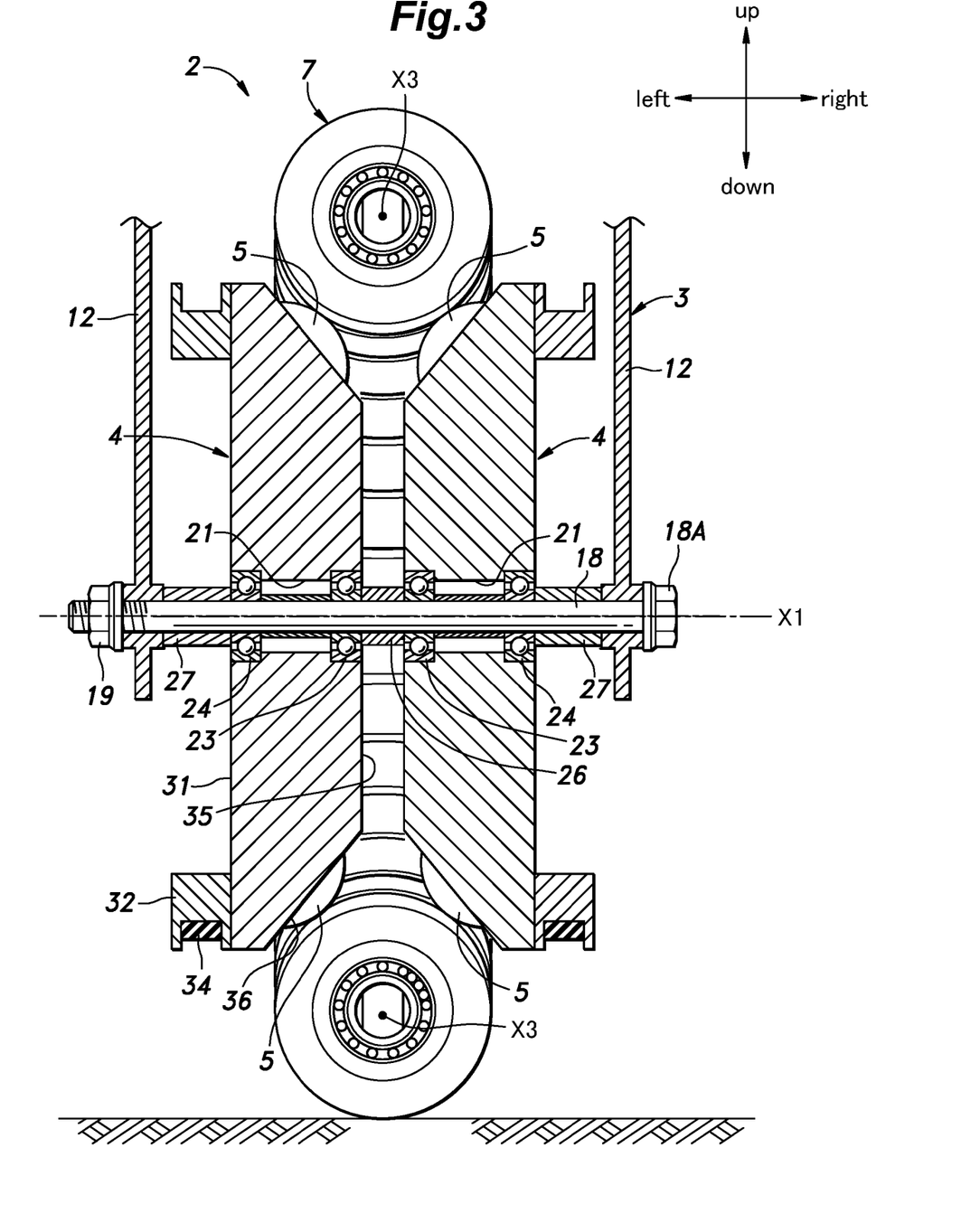
FIG. 3 is a cross-sectional view taken along a line of FIG. 2.

As shown in FIGS. 1 to 3, an inverted pendulum vehicle 1 includes a frictional drive unit 2. The frictional drive unit 2 includes a frame 3, a pair of drive disks 4 rotatably supported by the frame 3, a plurality of drive rollers 5 rotatably supported by each drive disk 4, an annular main wheel 7 arranged between the pair of drive disks 4 and coming into contact with the drive rollers 5, and a pair of actuators 8 configured to independently rotate the pair of drive disks 4.

As shown in FIG. 1, the frame 3 includes an upper frame 11 substantially formed in a parallelepiped-like shape, left and right lower frames 12 respectively extending downward from left and right lower ends of the upper frame 11, and left and right lower plates 13 respectively connected to the lower frames 12. A saddle 14 for supporting the buttocks of an occupant is attached to an upper portion of the upper frame 11. Left and right footrests 15 for supporting the soles of the occupant are attached to lower ends of the lower plates 13.

As shown in FIG. 3, the left and right drive disks 4 are arranged between the left and right lower frames 12. A support shaft 18 extends between the left and right lower frames 12. The support shaft 18 extends laterally. A left end of the support shaft 18 passes through the left lower frame 12, and a right end of the support shaft 18 passes through the right lower frame 12. The support shaft 18 includes a bolt head 18A at a base end thereof, and comes into contact with one of the lower frames 12 at the bolt head 18A. A nut 19 is attached to the tip of the support shaft 18, and thus the support shaft 18 is fixed to the lower frames 12.

The left and right drive disks 4 can be made of various materials, and may be made of metal or resin, for example. Each of the left and right drive disks 4 is formed in a disk-like shape, and provided with a circular hole 21 (a through hole) in the center thereof. The support shaft 18 passes through the circular hole 21 of each of the left and right drive disks 4. The left and right drive disks 4 are supported by the left and right lower frames 12 via the support shaft 18. The left and right drive disks 4 are supported by the support shaft 18 to rotate around a rotational axis X1 passing through the support shaft 18. A first bearing 23 and a second bearing 24 such as ball bearings are attached to the circular hole 21, and each of the left and right drive disks 4 are supported by the support shaft 18 via the first bearing 23 and the second bearing 24. The first bearing 23 is provided on a side close to the center of the support shaft 18, and the second bearing 24 is provided on an end side of the support shaft 18.

A first spacer 26 is interposed between the left and right first bearings 23. The first spacer 26 is formed in a cylindrical shape, and supported on an outer circumference of the support shaft 18. The first spacer 26 forms a gap between the left and right first bearings 23 and between the left and right drive disks 4. Second spacers 27 are provided between the second bearing 24 of the left drive disk 4 and the left lower frame 12 and between the second bearing 24 of the right drive disk 4 and the right lower frame 12. The first spacer 26 and the pair of second spacers 27 determine the lateral positions of the left and right drive disks 4 with respect to the left and right lower frames 12.

Driven pulleys 32 are respectively provided on first surfaces 31 (surfaces that face away from each other) of the left and right drive disks 4. The driven pulleys 32 are provided coaxially with the drive disks 4. The upper frame 11 is provided with a right actuator 8 for driving the right drive disk 4 and a left actuator 8 for driving the left drive disk 4. Each actuator 8 consists of, for example, an electric motor. A drive pulley 33 is provided on an output shaft of each actuator 8. The drive pulley 33 and the driven pulley 32, which correspond to each other in the lateral direction, are connected by a belt 34. The left and right actuators 8 can rotate independently of each other, thereby rotating the left and right drive disks 4 independently.

Figure 4:
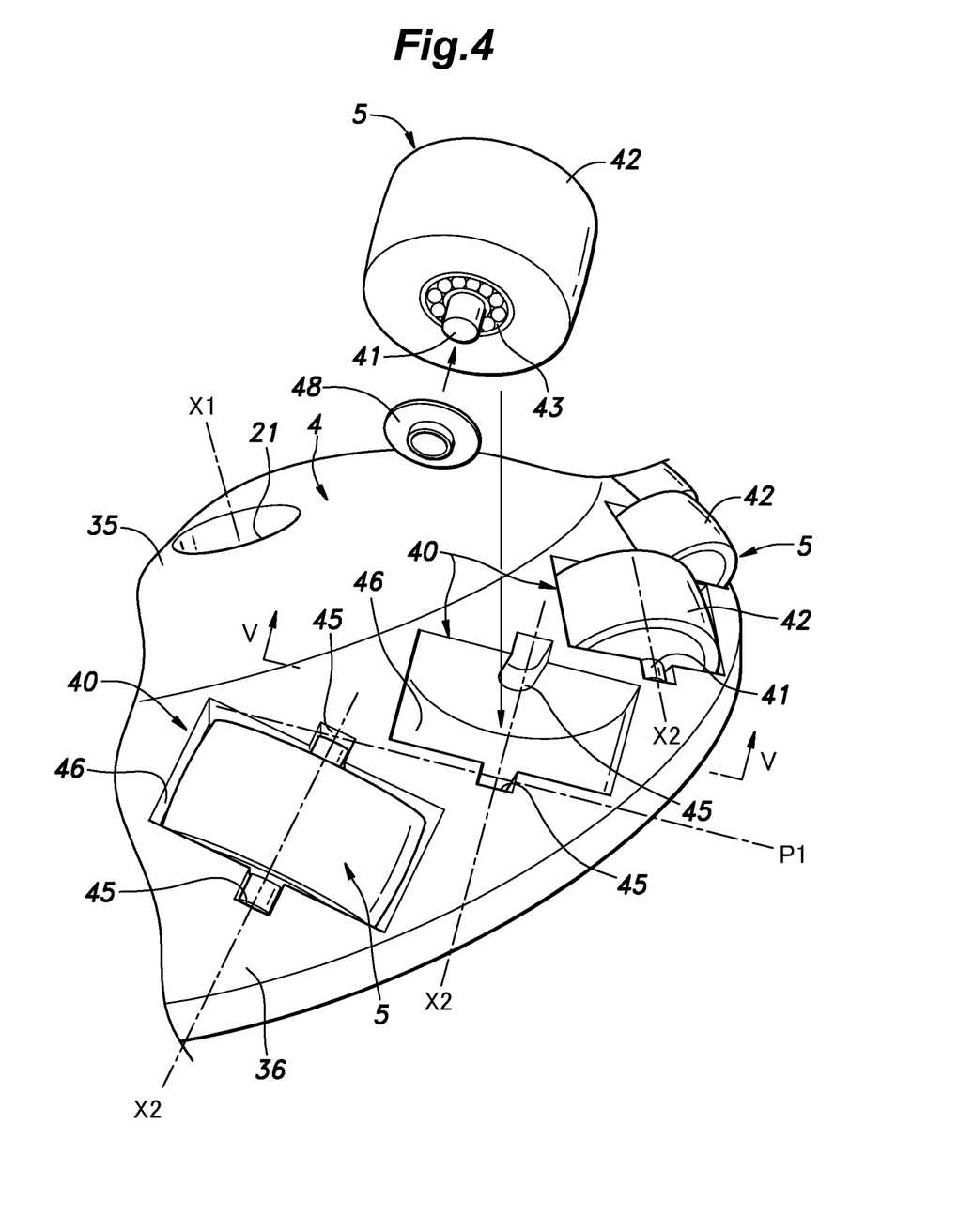
FIG. 4 is a perspective view of a drive disk and drive rollers.

As shown in FIGS. 3 and 4, outer circumferential portions of second surfaces 35 (surfaces opposed to each other) of the pair of drive disks 4 are provided with inclined portions 36 inclined to opposite sides as extending radially outward. According to the presence of the inclined portion 36, each drive disk 4 becomes thinner as extending radially outward. According to the presence of the inclined portion 36, each drive disk 4 is formed in a truncated cone-like shape.

A plurality of drive roller support portions 40 for supporting the drive rollers 5 are formed on the outer circumferential portion (namely, the inclined portion 36) of the second surface 35 of each drive disk 4. Each drive roller 5 includes a columnar roller shaft 41 and a cylindrical roller body 42 provided coaxially with the roller shaft 41 on an intermediate portion in the longitudinal direction of the roller shaft 41. In the present embodiment, the roller body 42 is rotatably supported by the roller shaft 41. Bearings 43 such as ball bearings may be interposed between the roller shaft 41 and the roller body 42. In another embodiment, the roller body 42 may be coupled to the roller shaft 41, and thus the roller body 42 and the roller shaft 41 may rotate integrally. The roller shaft 41 penetrates through the roller body 42, and both ends of the roller shaft 41 protrude from the roller body 42.

Figure 5:
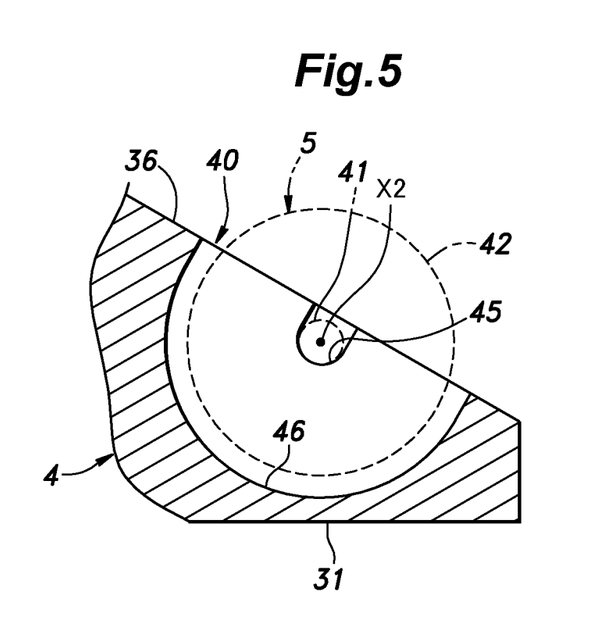
FIG. 5 is a cross-sectional view taken along a line V-V of FIG. 4.

As shown in FIGS. 4 and 5, each drive roller support portion 40 is provided with a pair of bearing grooves 45 configured to receive both ends of the roller shaft 41 of each drive roller 5 and a roller receiving portion 46 provided between the pair of bearing grooves 45 and configured to partially receive the roller body 42. In the present embodiment, the pair of bearing grooves 45 and the roller receiving portion 46 are recessed portions recessed on a surface of the inclined portion 36. The pair of bearing grooves 45 and the roller receiving portion 46 extend along a common support portion axis X2. The roller receiving portion 46 is continuous with the pair of bearing grooves 45. The pair of bearing grooves 45 and the roller receiving portion 46 may be recessed in a direction perpendicular to a surface of the inclined portion 36. Further, the pair of bearing grooves 45 and the roller receiving portion 46 may open toward the main wheel 7, namely, toward a side from which these elements receive a pressing force by the main wheel 7.

The pair of bearing grooves 45 are formed in such a size that end portions of the roller shaft 41 can be fitted thereinto from a surface side of the inclined portion 36. Preferably, the bearing grooves 45 are formed in such a size that the roller shaft 41 fits thereinto without rattling. Preferably, the bottom of each bearing groove 45 is formed in a semi-cylindrical shape to come into contact with a circumferential surface of the roller shaft 41. The depth of each bearing groove 45 may be set greater than the diameter of the roller shaft 41. Further, a bushing 48 may be attached to each of the pair of bearing grooves 45. The bushing 48 may include a cylindrical portion into which the roller shaft 41 is inserted and a disk-like flange portion extending radially outward from one end of the cylindrical portion. Each bearing groove 45 may be configured to receive the cylindrical portion of the bushing 48.

The roller receiving portion 46 is formed in such a shape that the roller receiving portion 46 does not come into contact with the roller body 42 in a state where the roller shaft 41 is received by the bearing grooves 45. The roller receiving portion 46 has a semicircular cross section when viewed in the direction along the support portion axis X2 (the axis of the bearing grooves 45). That is, the bottom of the roller receiving portion 46 is formed in a semi-cylindrical surface. The width (diameter) of the roller receiving portion 46 is larger than the diameter of the roller body 42. According to this configuration, the roller receiving portion 46 can be made smaller, so that the rigidity of the drive disk 4 can be enhanced.

Each drive roller support portion 40 is arranged in the drive disk 4 such that the support portion axis X2 of the drive roller support portion 40 is inclined relative to the circumferential direction (tangential direction) around the rotational axis X1 of the drive disk 4 and the radial direction around the rotational axis X1. Further, each drive roller support portion 40 is arranged in the drive disk 4 such that the support portion axis X2 of the drive roller support portion 40 is inclined relative to a plane perpendicular to the rotational axis X1 of the drive disk 4. The drive roller support portions 40 are formed in rotationally symmetric shapes around the rotational axis X1 of the drive disk 4. The drive roller support portions 40 are arranged at equal intervals in the circumferential direction around the rotational axis X1 of the drive disk 4.

Each drive disk 4 is configured such that one bearing groove 45 of a drive roller support portion 40 corresponding to a drive roller 5 adjacent to one drive roller 5 is arranged on a plane P1 that passes through another bearing groove 45 of another drive roller support portion 40 corresponding to the one drive roller 5 and is perpendicular to the support portion axis X2 (the axis of the one drive roller 5). By arranging the drive roller support portions 40 adjacent to each other in such a positional relationship, the distance between adjacent drive rollers 5 can be reduced, so that the drive rollers 5 can be arranged with high density.

Both ends of the roller shaft 41 of the drive roller 5 are inserted into the pair of bearing grooves 45 from the surface side of the inclined portion 36, and thus the drive roller 5 is supported by the drive roller support portion 40. Both ends of the roller shaft 41 may be detachably inserted into each bearing groove 45. Alternatively, both ends of the roller shaft 41 may be press-fitted into each bearing groove 45 and thus fixed to each bearing groove 45. That is, both ends of the roller shaft 41 may be non-rotatably supported by each bearing groove 45. In a state where the drive roller 5 is supported by the drive roller support portion 40, one portion of the roller body 42 is received inside the roller receiving portion 46, and the other portion of the roller body 42 protrudes outward from the roller receiving portion 46. That is, the other portion of the roller body 42 is arranged outside the surface of the inclined portion 36. In a state where the drive roller 5 is supported by the drive roller support portion 40, the roller body 42 is configured to rotate around the support portion axis X2 without coming into contact with the roller receiving portion 46.

As shown in FIGS. 1 to 3, the main wheel 7 is formed in an annular shape, and is arranged between the pair of drive disks 4 so as to be coaxial therewith. The main wheel 7 comes into contact with the plurality of drive rollers 5, and is configured to rotate around a central axis and an annular axis. In the present embodiment, the main wheel 7 includes an annular core member 51 and a plurality of driven rollers 52 rotatably supported by the core member 51. The plurality of driven rollers 52 is arranged at equal intervals in the circumferential direction of the core member 51. Each driven roller 52 is supported by the core member 51 to rotate around an axis X3 (annular axis) of the annular core member 51. More specifically, each driven roller 52 can rotate around the tangent of the core member 51 at the respective position with respect to the core member 51. Upon receiving an external force, each driven roller 52 rotates with respect to the core member 51.

The main wheel 7 is arranged along the outer circumferential portions of the left and right drive disks 4, and comes into contact with the plurality of drive rollers 5 of the left and right drive disks 4. The drive rollers 5 of the left and right drive disks 4 come into contact with an inner circumferential portion of the main wheel 7, and hold the main wheel 7 from both lateral sides thereof. Further, the drive rollers 5 of the left and right drive disks 4 come into contact with the inner circumferential portion of the main wheel 7, thereby suppressing the displacement of the drive disks 4 in the radial direction around the rotational axis X1. Accordingly, the main wheel 7 is supported by the left and right drive disks 4, and the central axis of the main wheel 7 (the core member 51) is arranged coaxially with the rotational axis X1 of the left and right drive disks 4.

The driven rollers 52 of the main wheel 7 come into contact with the drive rollers 5 of the left and right drive disks 4. The pair of bearing grooves 45 of each drive roller support portion 40 open toward the main wheel 7, more specifically, toward the annular axis X3 of the main wheel 7. Accordingly, each drive roller 5 comes into contact with the main wheel 7, and thus the movement of the roller shaft 41 in a direction to cause the roller shaft 41 to fall off the bearing grooves 45 is restricted.

An example of an attachment method of the pair of drive disks 4, the plurality of drive rollers 5, and the main wheel 7 will be described. First, arranging the first drive disk 4 such that the second surface 35 thereof faces upward. Next, inserting the drive rollers 5 into the drive roller support portions 40 of the first drive disk 4 arranged as above. Next, arranging the main wheel 7 on the plurality of drive rollers 5 attached to the first drive disk 4. Next, arranging the second drive disk 4 such that the second surface 35 thereof faces upward, and inserting the drive rollers 5 into the drive roller support portions 40. Then, arranging the first spacer 26 at the center of the second drive disk 4. Next, reversing the first drive disk 4 such that the second surface 35 thereof faces downward while preventing each drive roller 5 from falling off by the main wheel 7, and arranging the first drive disk 4 on the second drive disk 4 in this state. Accordingly, it is possible to arrange the main wheel 7 between the pair of drive disks 4 while preventing each drive roller 5 from falling off.

As shown in FIG. 1, left and right front ends of a tail wheel arm 61 are supported by the left and right lower plates 13 to rotate around an axis extending in the lateral direction. The rotational axis of the tail wheel arm 61 may match the rotational axis X1 of the drive disks 4. The tail wheel arm 61 extends rearward from a front end thereof, which is bifurcated. A tail wheel 62 is provided at a rear end of the tail wheel arm 61. The tail wheel 62 is, for example, an omni-wheel, and is supported by the rear end of the tail wheel arm 61 to rotate around an axis extending in the front-and-rear direction. The tail wheel 62 is configured to be rotated by a tail wheel motor 63, which is an electric motor provided at the rear end of the tail wheel arm 61.

As shown in FIG. 1, an electrical device 65 is attached to the upper frame 11 in front of the left and right actuators 8. The electrical device 65 includes an electronic control unit, a gyro sensor, a motor drive unit, and the like. The electronic control unit maintains the posture of the inverted pendulum vehicle 1 based on an inverted pendulum control rule, and controls the left and right actuators 8 to move the inverted pendulum vehicle 1 according to the movement of the center of gravity of the occupant. Further, the electronic control unit controls the tail wheel motor 63 to turn the inverted pendulum vehicle 1 in response to the movement of the center of gravity of the occupant. Although not shown, the frame 3 is provided with a battery that supplies electric power to the electrical device 65.

The main wheel 7 and the tail wheel 62 of the inverted pendulum vehicle 1 are grounded. When the main wheel 7 rotates around the central axis thereof that matches the rotational axis X1, the inverted pendulum vehicle 1 moves in the front-and-rear direction. When the main wheel 7 rotates around the annular axis X3 and the tail wheel 62 rotates around an axis extending in the front-and-rear direction, the inverted pendulum vehicle 1 moves in the lateral direction. When the main wheel 7 rotates around the annular axis X3 and the tail wheel 62 does not rotate around the axis extending in the front-and-rear direction, or when the tail wheel 62 rotates around the axis extending in the front-and-rear direction and the main wheel 7 does not rotate, the inverted pendulum vehicle 1 turns (rotates) in the lateral direction.

In a case where the left and right drive disks 4 rotate in the same direction at the same rotational speed, the main wheel 7 rotates together with the left and right drive disks 4. Namely, the main wheel 7 rotates around its own rotational axis that matches the rotational axis X1, and the inverted pendulum vehicle 1 moves forward or backward. At this time, the driven rollers 52 of the main wheel 7 do not rotate with respect to the core member 51.

In a case where there is a difference in the rotational speeds of the left and right drive disks 4, a component force is applied from the left and right drive rollers 5 to the driven rollers 52 of the main wheel 7. The component force is a force in a direction perpendicular to a force in the circumferential direction (tangential direction) caused by the rotation of the left and right drive disks 4. The axis (the support portion axis X2) of each drive roller 5 is inclined relative to the circumferential direction of the drive roller 5 (the left and right drive disks 4), and thus the component force is generated due to the difference in the rotational speeds of the left and right drive disks 4. Owing to this component force, the driven rollers 52 rotate with respect to the core member 51.

When the tail wheel 62 is rotated by the tail wheel motor 63, the inverted pendulum vehicle 1 rotates around the grounding point of the main wheel 7.

In the frictional drive unit 2 according to the embodiment, it is possible to cause each drive disk 4 to rotatably support the drive rollers 5 by simply fitting the roller shaft 41 into the bearing grooves 45 from an opening side thereof. After the roller shaft 41 is received by the bearing grooves 45, the main wheel 7 is arranged between the pair of drive disks 4 and comes into contact with the drive rollers 5, so that the drive rollers 5 can be prevented from falling off the bearing grooves 45. According to this configuration, the drive disk 4 does not need a space for inserting the roller shaft 41 into the bearing grooves 45 in the direction along the support portion axis X2, so that the drive rollers 5 can be arranged with high density. Further, an operation to attach the drive rollers 5 to the drive disk 4 can be facilitated.

In the configuration in which the roller shaft 41 is press-fitted into the bearing grooves 45, the roller shaft 41 is fixed and thus the rotational direction of the drive roller 5 can be stabilized. Further, it is possible to prevent the drive roller 5 from falling off from the drive roller support portion 40.

Figure 6:
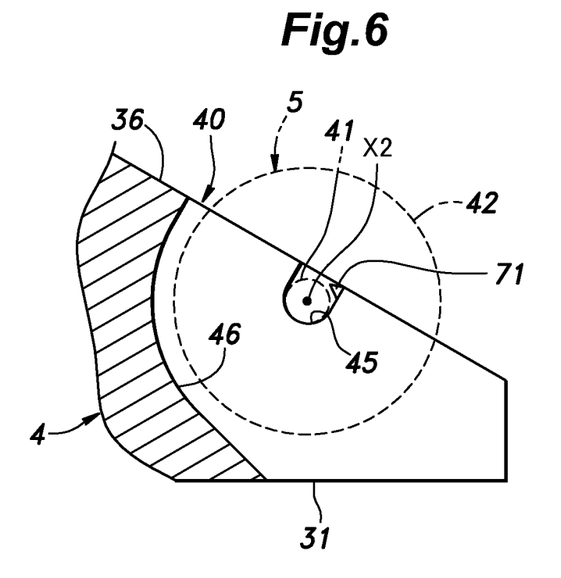
FIG. 6 is a cross-sectional view of a drive roller support portion according to a modification of the embodiment.

Concrete embodiments of the present invention have been described in the foregoing, but the present invention should not be limited by the foregoing embodiments and various modifications and alterations are possible within the scope of the present invention. For example, the width at an open end of each bearing groove 45 may be smaller than the diameter of the roller shaft 41. For example, as shown in FIG. 6, a flexible protrusion 71 may be provided at the open end of each bearing groove 45. According to such a configuration, when inserting the roller shaft 41 into the bearing grooves 45, pushing the roller shaft 41 into the bearing grooves 45 while elastically deforming the protrusion 71. When the roller shaft 41 passes through the protrusion 71, the protrusion 71 is restored and thus the roller shaft 41 is prevented from falling off the bearing grooves 45.

Figure 7:
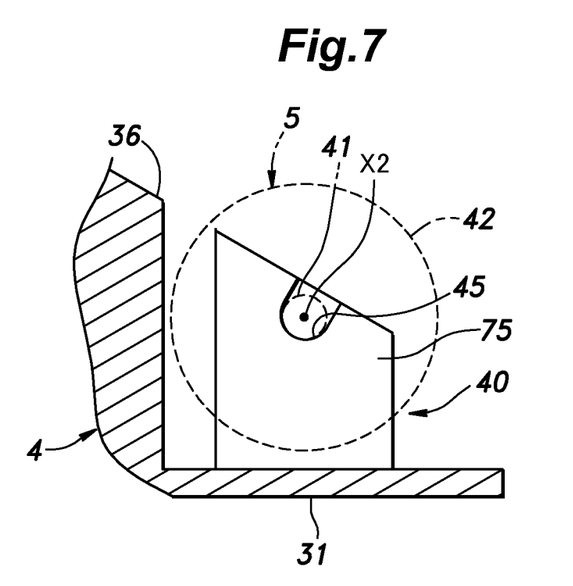
FIG. 7 is a cross-sectional view of a drive roller support portion according to another modification of the embodiment.

As shown in FIG. 6, the roller receiving portion 46 may penetrate to the first surface 31 of the drive disk 4. As shown in FIG. 7, each drive roller support portion 40 may include a pair of bearing walls 75 provided with the bearing grooves 45 at the tips thereof. The pair of bearing walls 75 may be arranged parallel to each other, and the roller body 42 may be arranged in a space formed between the pair of bearing walls 75.

Various shapes can be applied to the shape of each bearing groove 45. For example, each bearing groove 45 may be a V-shaped groove. Further, the cross section of the bearing groove 45 may be a quadrangle.

The main wheel 7 may be an annular member made of a flexible material. The annular member may have a circular cross section and rotate around the central axis thereof and the annular axis. The annular member may be made of, for example, rubber.

The central axis of the main wheel 7 may be offset from the rotational axis X1 of the drive disks 4. For example, the central axis of the main wheel 7 may be arranged above the rotational axis X1 of the drive disks 4. In this case, some of the driven rollers 52 arranged at a lower portion of the main wheel 7 may come into contact with some of the drive rollers 5 of the left and right drive disks 4. That is, some of the driven rollers 52 arranged at an upper portion of the main wheel 7 do not necessarily come into contact with some of the drive rollers 5 of the left and right drive disks 4.

Glossary of Terms

1: inverted pendulum vehicle
2: frictional drive unit
3: frame
4: drive disk
5: drive roller
7: main wheel
8: actuator
18: support shaft
36: inclined portion
40: drive roller support portion
42: roller body
43: bearing
45: bearing groove
46: roller receiving portion
51: core member
52: driven roller
P1: plane
X1: rotational axis
X2: support portion axis
X3: axis

The invention claimed is:

1. A frictional drive unit, comprising:
a frame;
a pair of drive disks rotatably supported by the frame, arranged coaxially, and opposed to each other;
a plurality of drive rollers provided on an outer circumferential portion of each drive disk and arranged at intervals in a circumferential direction of the drive disk, each drive roller being supported to rotate around an axis inclined relative to the circumferential direction of the drive disk;
a pair of actuators configured to independently rotate the pair of drive disks; and
a main wheel formed in an annular shape, arranged between the pair of drive disks, coming into contact with the drive rollers, and configured to rotate around a central axis and an annular axis,
wherein each drive roller includes a roller shaft and a round roller body provided on an intermediate portion of the roller shaft,
each drive disk includes plural pairs of bearing grooves each receiving both ends of the roller shaft of each drive roller, and
bearing grooves open toward the main wheel.

2. The frictional drive unit according to claim 1, wherein each drive disk is configured such that one bearing groove corresponding to a drive roller adjacent to one drive roller is arranged on a plane that passes through another bearing groove corresponding to the one drive roller and is perpendicular to an axis of the one drive roller.

3. The frictional drive unit according to claim 1, wherein a width at an open end of each bearing groove is smaller than a diameter of the roller shaft.

4. The frictional drive unit according to claim 1, wherein outer circumferential portions of surfaces opposed to each other of the pair of drive disks are provided with inclined portions that are inclined to opposite sides as extending radially outward,
the bearing grooves are recessed in each inclined portion, and
a roller receiving portion configured to partially receive the roller body is provided between each pair of bearing grooves corresponding to one of the drive rollers.

5. The frictional drive unit according to claim 4, wherein the bearing grooves and the roller receiving portion are recessed in a direction perpendicular to a surface of each inclined portion.

6. The frictional drive unit according to claim 4 or 5, wherein the roller receiving portion has a semicircular cross section when viewed in a direction along an axis of the bearing grooves.

7. The frictional drive unit according to claim 1, wherein the roller body is rotatably supported by the roller shaft, and
both ends of the roller shaft are non-rotatably supported by the corresponding bearing grooves.

8. The frictional drive unit according to claim 7, wherein both ends of the roller shaft are press-fitted into the corresponding bearing grooves.

* * * * *